US006920562B1

(12) United States Patent
Kerr et al.

(10) Patent No.: US 6,920,562 B1
(45) Date of Patent: Jul. 19, 2005

(54) TIGHTLY COUPLED SOFTWARE PROTOCOL DECODE WITH HARDWARE DATA ENCRYPTION

(75) Inventors: Darren Kerr, Palo Alto, CA (US); John William Marshall, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/216,519

(22) Filed: Dec. 18, 1998

(51) Int. Cl.[7] ................................................. H04L 9/00

(52) U.S. Cl. ...................... 713/189; 713/174; 713/189; 380/28; 712/18

(58) Field of Search ........................... 380/28; 713/189, 713/174; 712/18

(56) References Cited

U.S. PATENT DOCUMENTS

| | | | |
|---|---|---|---|
| 4,590,554 A | 5/1986 | Glazer et al. ............... | 364/200 |
| 4,598,400 A | 7/1986 | Hillis ........................... | 370/60 |
| 4,709,327 A | 11/1987 | Hillis et al. .................. | 364/200 |
| 4,773,038 A | 9/1988 | Hillis et al. .................. | 364/900 |
| 4,791,641 A | 12/1988 | Hillis ........................... | 371/38 |
| 4,805,091 A | 2/1989 | Thiel et al. .................. | 364/200 |
| 4,809,202 A | 2/1989 | Wolfram ..................... | 364/578 |
| 4,870,568 A | 9/1989 | Kahle et al. ................. | 364/200 |
| 4,922,418 A | 5/1990 | Dolecek ....................... | 364/200 |
| 4,922,486 A | 5/1990 | Lidinsky et al. ............... | 370/60 |
| 4,954,988 A | 9/1990 | Robb ..................... | 365/189.02 |
| 4,965,717 A | 10/1990 | Cutts, Jr. et al. ........... | 364/200 |
| 4,993,028 A | 2/1991 | Hillis ........................ | 371/39.1 |
| 5,007,089 A * | 4/1991 | Matyas et al. ............... | 380/280 |
| 5,070,446 A | 12/1991 | Salem ......................... | 395/500 |
| 5,070,528 A * | 12/1991 | Hawe et al. .................. | 380/48 |
| 5,093,801 A | 3/1992 | White et al. ................ | 364/726 |
| 5,111,198 A | 5/1992 | Kuszmaul .............. | 340/825.52 |
| 5,113,503 A * | 5/1992 | Sasaki et al. ................ | 712/212 |

(Continued)

OTHER PUBLICATIONS

The Microsoft Press Computer Dictionary 1997, Microsoft Press, 3rd ed., p. 320.*
Schneier, Bruce, Applied Cryptography 1996, John Wiley and Sons, Inc., 2nd ed., pp. 265–301.*
U.S. Appl. No. 09/106,478, Kerr et al.
U.S. Appl. No. 09/106,478, filed Jun. 29, 1998, Kerr et al.
U.S. Appl. No. 09/212,314, filed Dec. 14, 1998, Scott et al.
U.S. Appl. No. 09/727,068, filed Nov. 30, 2000, Wright et al.
IEEE 1149.1 Device Architecture (continued), Using the Instruction Register (IR), http://www.asset–intertech.com/homepage/bscantutr/arch2.htm#UsingIR, pp. 1–4, 1998.
The Principle of Boundary–Scan Architecture, http://www.asset–intertech.com/homepage/bscantutr/principl.htm, pp. 1–4, 1998.
IEEE 1149.1 Device Architecture, http://www.asset–intertech.com/homepage/bscantutr/arch.htm, pp. 1–3, 1998.
IEEE 1149.1 Device Architecture (continued), The Test Access Port (TAP), http://www.asset–intertech.com/homepage/bscantutr/arch3.htm#TAP, pp. 1–3, 1998.
Digital Systems Testing and Testable Design, Miron Abramovici, et al., Computer Science Press, pp. 342–409, Copyright 1990.

*Primary Examiner*—Andrew Caldwell
*Assistant Examiner*—Paul E. Callahan
(74) *Attorney, Agent, or Firm*—Cesari and McKenna, LLP

(57) ABSTRACT

An encryption mechanism tightly-couples hardware data encryption functions with software-based protocol decode processing within a pipelined processor of a programmable processing engine. Tight-coupling is achieved by a micro-architecture of the pipelined processor that allows encryption functions to be accessed as a novel encryption execution unit of the processor. Such coupling substantially reduces the latency associated with conventional hardware/software interfaces.

49 Claims, 8 Drawing Sheets

U.S. PATENT DOCUMENTS

| | | | |
|---|---|---|---|
| 5,113,510 A | 5/1992 | Hillis | 395/425 |
| 5,117,420 A | 5/1992 | Hillis et al. | 370/60 |
| 5,129,077 A | 7/1992 | Hillis | 395/500 |
| 5,148,547 A | 9/1992 | Kahle et al. | 395/800 |
| 5,151,996 A | 9/1992 | Hillis | 395/800 |
| 5,157,663 A | 10/1992 | Major et al. | 371/9.1 |
| 5,161,156 A | 11/1992 | Baum et al. | |
| 5,166,674 A | 11/1992 | Baum et al. | |
| 5,175,865 A | 12/1992 | Hillis | 395/800 |
| 5,182,800 A * | 1/1993 | Farrell et al. | 395/425 |
| 5,212,773 A | 5/1993 | Hillis | 395/200 |
| 5,222,216 A | 6/1993 | Parish et al. | 395/275 |
| 5,222,237 A | 6/1993 | Hillis | 395/650 |
| 5,247,613 A | 9/1993 | Bromley | 395/200 |
| 5,247,694 A | 9/1993 | Dahl | 395/800 |
| 5,255,291 A | 10/1993 | Holden et al. | 375/111 |
| 5,261,105 A | 11/1993 | Potter et al. | 395/725 |
| 5,265,207 A | 11/1993 | Zak et al. | 395/200 |
| 5,274,631 A | 12/1993 | Bhardwaj | 370/60 |
| 5,289,156 A | 2/1994 | Ganmukhi | 340/146.2 |
| 5,295,258 A | 3/1994 | Jewett et al. | 395/575 |
| 5,301,310 A | 4/1994 | Isman et al. | 395/575 |
| 5,317,726 A | 5/1994 | Horst | 395/575 |
| 5,325,487 A | 6/1994 | Au et al. | 395/250 |
| 5,349,680 A | 9/1994 | Fukuoka | 395/800 |
| 5,355,492 A | 10/1994 | Frankel et al. | 395/700 |
| 5,357,612 A | 10/1994 | Alaiwan | 395/200 |
| 5,361,363 A | 11/1994 | Wells et al. | 395/800 |
| 5,367,692 A | 11/1994 | Edelman | 395/800 |
| 5,388,214 A | 2/1995 | Leiserson et al. | 395/200 |
| 5,388,262 A | 2/1995 | Hillis | 395/650 |
| 5,390,298 A | 2/1995 | Kuszmaul et al. | 395/200 |
| 5,404,296 A | 4/1995 | Moorhead | 364/421 |
| 5,404,562 A | 4/1995 | Heller et al. | 395/800 |
| 5,410,723 A | 4/1995 | Schmidt et al. | 395/800 |
| 5,455,932 A | 10/1995 | Major et al. | 395/489 |
| 5,475,856 A | 12/1995 | Kogge | 395/800 |
| 5,485,627 A | 1/1996 | Hillis | 395/800 |
| 5,530,809 A | 6/1996 | Douglas et al. | 395/200.2 |
| 5,535,408 A | 7/1996 | Hillis | 395/800 |
| 5,561,669 A | 10/1996 | Lenney et al. | 370/60.1 |
| 5,568,380 A | 10/1996 | Brodnax et al. | 364/184 |
| 5,613,136 A | 3/1997 | Casavant et al. | 395/800 |
| 5,617,538 A | 4/1997 | Heller | 395/200.02 |
| 5,621,885 A | 4/1997 | Del Vigna, Jr. | 395/182.11 |
| 5,627,965 A | 5/1997 | Liddell et al. | 395/185.01 |
| 5,673,423 A | 9/1997 | Hillis | 395/553 |
| 5,706,489 A * | 1/1998 | Chi et al. | 712/228 |
| 5,710,814 A | 1/1998 | Klemba et al. | 380/9 |
| 5,742,604 A | 4/1998 | Edsall et al. | 370/401 |
| 5,748,936 A | 5/1998 | Karp et al. | 395/394 |
| 5,751,955 A | 5/1998 | Sonnier et al. | 395/200.19 |
| 5,764,636 A | 6/1998 | Edsall | 370/401 |
| 5,764,645 A * | 6/1998 | Bernet et al. | 370/395.52 |
| 5,781,753 A | 7/1998 | McFarland et al. | 395/394 |
| 5,787,243 A | 7/1998 | Stiffler | 395/182.11 |
| 5,787,255 A | 7/1998 | Parlan et al. | 395/200.63 |
| 5,812,811 A | 9/1998 | Dubey et al. | 395/392 |
| 5,832,291 A | 11/1998 | Rosen et al. | 395/800.11 |
| 5,838,915 A | 11/1998 | Klausmeier et al. | 395/200.45 |
| 5,860,086 A | 1/1999 | Crump et al. | 711/109 |
| 5,872,963 A | 2/1999 | Bitar et al. | 395/580 |
| 5,960,211 A | 9/1999 | Schwartz et al. | 395/800.22 |
| 6,026,490 A * | 2/2000 | Johns-Vano et al. | 713/200 |
| 6,035,422 A | 3/2000 | Hohl et al. | 714/35 |
| 6,088,800 A | 7/2000 | Jones et al. | |
| 6,101,599 A | 8/2000 | Wright et al. | |
| 6,119,215 A | 9/2000 | Key et al. | |
| 6,157,955 A * | 12/2000 | Narad et al. | 709/228 |
| 6,173,386 B1 * | 1/2001 | Key et al. | 712/10 |
| 6,195,739 B1 | 2/2001 | Wright et al. | |

\* cited by examiner

INITIALIZE:

910 — XDES ENCRYPT

LOAD INITIAL KEY:

920 — MOR r0, r0, KEY(r0)         INIT KEY 922                        924

LOAD PLAINTEXT AND START DES:

930 — MOR r0, r0, PLAIN(r0)         DES
          (SINGLE DES FUNCTION)

LOAD CIPHERTEXT:

910 — SPR, IAR, DES-RESULT

WRITE CIPHERTEXT:

950 — MOR CIPHER(r0), r0, r0        TR

960 — MOR (rl), r0, PLAINI(r0)       DES

FIG. 9

TIGHTLY COUPLED SOFTWARE PROTOCOL DECODE WITH HARDWARE DATA ENCRYPTION

BACKGROUND OF THE INVENTION

The invention relates generally to data encryption and, more specifically, to a technique for constructing high-performance network systems that have data encryption capabilities.

BACKGROUND OF THE INVENTION

Computer architecture generally defines the functional operation, including the flow of information and control, among individual hardware units of a computer. One such hardware unit is the processor or processing engine which contains arithmetic and logic processing circuits organized as a set of data paths. In some implementations, the data path circuits may be configured as a processor having internal registers for use with operations that are defined by a set of instructions. The instructions are typically stored in an instruction memory and specify a set of hardware functions that are available on the processor. When implementing these functions, the CPU generally processes "transient" data residing in a data memory in accordance with the instructions.

A high-performance processing engine configured for use in, e.g., an intermediate network station such as a router or switch may be realized by using a number of identical processors to perform certain tasks in parallel. For a purely parallel multiprocessor architecture, each processor may have shared or private access to non-transient data (such as "table" data contained in forwarding and routing tables, statistics, access filters and/or queuing information) stored in an external memory coupled to the processor. Another type of non-transient data stored in the external memory may be encryption key data used for encryption of the transient (e.g., message) data processed by the switch within a data communcations network.

Data encryption is critical in the context of data communications networks because of the security required for reliable data communications between applications executing on stations of the network. There are many mechanisms that provide security for messages transported over a data communications network, such as the Internet. Industry standards describe protocol conventions used when exchaging encrypted information. For example, RFC 1827 describes multiple modes (e.g., tunnel mode and transport mode) for exchanging data. In order to support such conventions, efficient protocol and data encryption processing solutions are needed for these stations, including network switches.

Software-based applications executing on a general-purpose processor of a switch provide a data encryption processing solution that is dependent upon protocol decode of messges by the processor. However, conventional encryption algorithms, such as the data encryption standard (DES), execute slowly on a general-purpose processor. Hardware-based encryption modules are available that interface with the processor, but that still require software-based protocol decode support. The resulting interface between software executing on the processor and the hardware encryption module substantially reduces the overall performance of the switch. Performance is adversely affected primarily because of the memory and input/output (I/O) bandwidth consumed by the encryption module when interacting with components of the switch; in addition, the overhead required to pass encryption keys and data to and from the module, e.g., over a bus contributes to the reduction in performance.

FIG. 1 is a schematic block diagram of a conventional switch 100 configured with conventional data encryption/decryption capabilites. The switch comprises a plurality of components including a central processing unit (CPU) 110, a memory 120, a network adapter 130 and an external interface (I/F) circuit 140 interconnected via a system bus 150. The network adapter 130 provides a connection to network media that enables transmission and reception of data messages hereinafter "packets") that require data encryption/decryption. For example, a packet received from the network media is accumulated by the adapter, which then performs a direct memory access (DMA) operation over the system bus 150 to store the packet in an allocated buffer of the memory 120. Thereafter, the CPU processes the packet to determine whether it needs encryption or decryption. An encryption/decryption (hereinafter "DES") module 160 is directly coupled to the external interface circuit 140 to provide the data encryption/decryption capabilities of the switch.

Since different protocols define different ways of encoding packets (see RFC 1827), hardware implementation of data encryption/decryption is generally complex and inefficient. That is, the overall encryption/decryption function provided by the DES hardware module 160 introduces significant latency as a result of the software-hardware interface of the switch 100. For example prior to actual encryption/decryption operations, software executing on the CPU 110 must identify the portion of the packet (i.e., the proper header) to decode in order to determine the appropriate protocol and encryption algorithm. If tunneling has occurred on the packet, such protocol decoding may not start at the beginning of the packet, thus requiring the CPU to parse the packet to retrieve the proper header (e.g., an IP header) and data ("payload") needing encryption/decryption. Software protocol processing may therefore contribute to the latency associated with the encryption/decryption function.

Specifically, decode processing of the IP header identifies the appropriate encryption keys 122 stored in memory 120 that are needed for encryption/decryption operations in accordance with RFC 1827. The keys are organized as data structures, such as tables 125, in the memory and generally stored as 64-bit fields within the tables. A common type of encryption operation is a "triple DES" operation that typically uses three keys. To perform such encryption, either the CPU moves the key data from memory 120 over the system bus 150 to the interface circuit 140 which then communicates with the DES module 160 or, alternatively, the interface circuitry 140 moves the data to the DES module 160 as part of a DMA operation.

Notably, the data moved to the DES module includes the payload ("cleartext" or "ciphertext"), the keys and, possibly, a previous session state. As for the latter, the states of different encryption modes/packets are saved at the DES module when multiplexing various packets over the system bus in an attempt to achieve "wire speed" encryption/decryption, which is typically performed 64 bits at a time. Generally, the keys are loaded only once per packet at the DES module, wherein loading of the packet may require many 64-bit data transfers. When multiplexing packets over the bus, however, constant reloading of the keys may be required. Thus, a total of at least four 64-bit system bus transfers (three keys and one data) is required to load the DES module in order to perform one triple DES operation.

Because of the previous protocol decode, the cleartext/ciphertext data transfer may cause a non-aligned access which must be subsequently aligned, thereby creating additional latency as well as consuming a significant amount of the bus bandwidth. Significant latency is also contributed when traversing the external interface 140 to the bus.

Processing latency is further introduced by coding constructs necessary to load the DES hardware module 160 with the required information and thereafter retrieve the results upon completion of the encrypted/decrypted operations. As for the latter, software executing on the CPU 110 is notified of hardware completion either by polling the hardware module or by interrupting the CPU. Since polling requests issued by the CPU are translated to bus read operations, polling consumes additional bus bandwidth, whereas interrupts may actually improve bus efficiency. However, an interrupt initiated by the hardware module causes the state of the processor to change while the interrupt is serviced; in this case, latency of the interrupt service routine is added to the overall latency.

Once encryption/decryption operations have completed at the DES module, the ciphertext/cleartext (and session state) are returned to the memory 120, where the data is staged prior to transmission through the adapter 130 over the network. Typically, the ciphertext/cleartext is staged in memory until an entire frame descriptor block is constructed for transmission as a frame/packet over the network.

It is apparent that data encryption/decryption by the hardware module arrangement described above entails substantial data movement over the system bus of the switch, thereby causing a "bottleneck" on the bus that adversely affects the performance of the switch. The present invention is directed towards reducing the amount of data movement and resulting latency in an intermediate station such as a switch when performing data encryption/decryption functions.

SUMMARY OF THE INVENTION

The invention relates to an encryption mechanism that tightly-couples hardware data encryption functions with software-based protocol decode processing within a pipelined processor of a programmable processing engine. Tight-coupling is achieved by a micro-architecture of the pipelined processor that allows encryption functions to be accessed as a novel encryption execution unit of the processor. As described herein, such coupling substantially reduces the latency associated with conventional hardware/software interfaces.

Specifically, the mechanism comprises, in part, an integrated software and hardware interface that enables the encryption execution unit to efficiently cooperate with other resources of the processor. An instruction decoder of the processor issues instructions, including native encryption opcodes, directly to the encryption execution unit to thereby substantially reduce encryption setup latency. These native encryption-opcodes are provided within the processor's instruction set and constitute the software portion of the interface that enables selective access to the encryption execution unit.

In the illustrative embodiment, the processor is embodied as customized micro-controller core having a multi-stage pipeline architecture that includes, inter alia, an execution stage of arithmetic logic units. The novel encryption execution unit is preferably a specialized encryption tightly coupled state machine (TCSM) unit that is selectively invoked within the execution stage. In response to decode processing of the native op codes, the encryption TCSM unit is invoked to perform encryption/decryption functions that utilize the hardware interface of the processor to access the processor's resources, including a plurality of high-performance internal busses that faciliate overlapping of operations. For instance, the encryption TCSM unit can simultaneously load an encryption key while storing a previous encryption result. Overlapping of operations improves encryption throughput by further reducing latency typically associated with a conventional encryption hardware module attached to a processor's external bus.

Advantageously, the inventive mechanism provides speed-up enhancements for the entire data encryption/decryption function. That is, the encryption mechanism eliminates at least two complete local bus transfers wherein each transfer comprises four 64-bit transfers along with latencies associated with traversing the external interface circuitry. Use of the specialized encryption TCSM unit obviates the physical limitation associated with pin counts of a hardware module coupled to the bus. The inventive mechanism substantially increases throughput of the memory subsystem by eliminating the shared memory bandwidth capability of the external interface between the system bus and a conventional DES module. Moreover, CPU notification of data encryption/decryption completion (interrupt-driven or polling) is eliminated by the invention, thereby reducing latencies and bandwidth associated with such notification.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 9 is an example of an illustrative program code segment of instructions, including novel native encryption opcodes, in accordance with the invention.

DETAILED DESCRIPTION OF AN ILLUSTRATIVE EMBODIMENT

Figure 1:
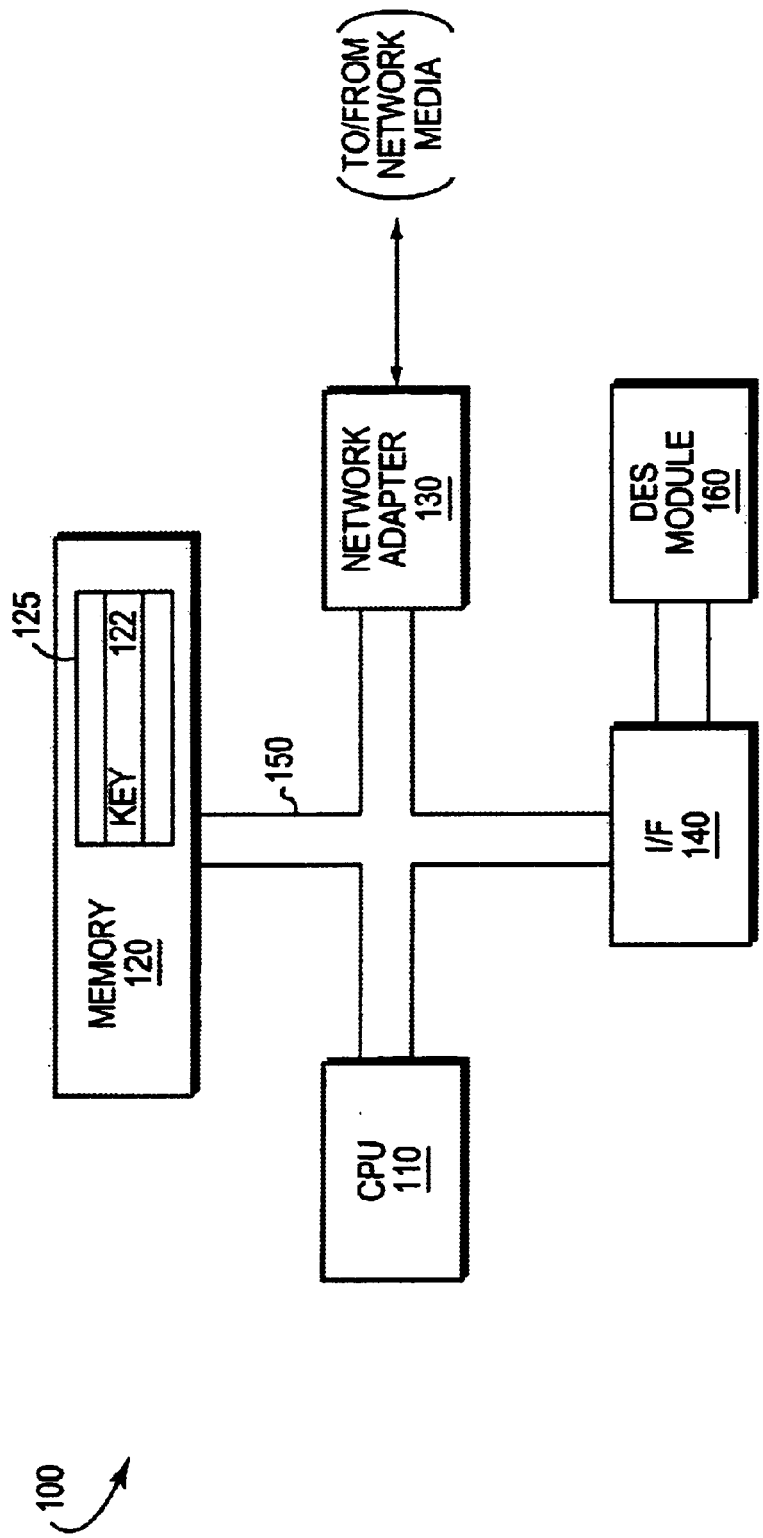
FIG. 1 is a schematic block diagram of an intermediate station, such as a switch, configured with conventional data encryption/decryption capabilites.
Figure 2:
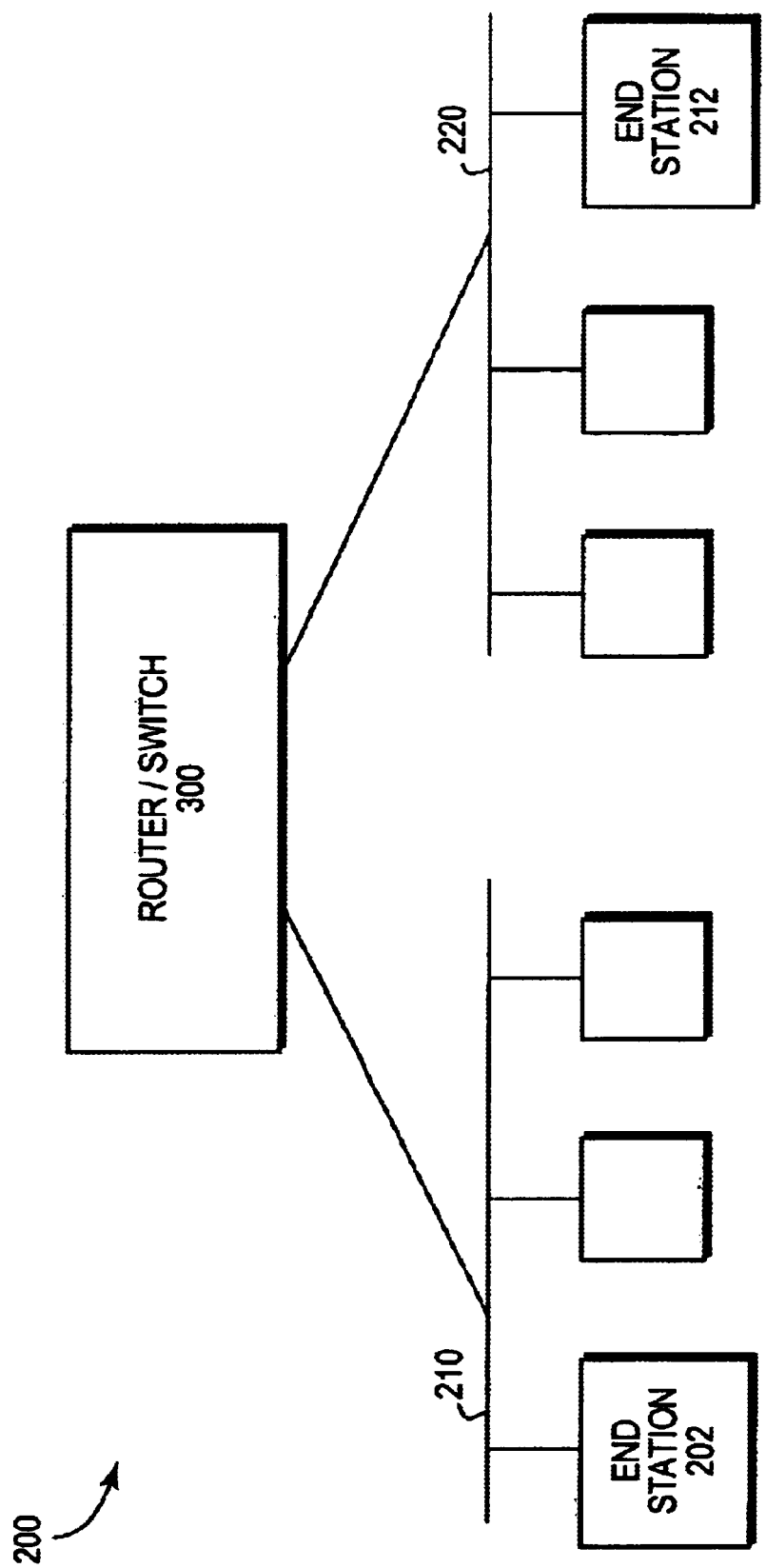
FIG. 2 is a block diagram of a computer network comprising a collection of interconnected communication media and subnetworks attached to a plurality of stations.

FIG. 2 is a block diagram of a computer network 200 comprising a collection of interconnected communication media and subnetworks attached to a plurality of stations. The stations are typically computers comprising end stations 202, 212 and intermediate station 300. The intermediate station 300 may be a router or a network switch, whereas the end stations 202, 212 may include personal computers or workstations. The subnetworks generally comprise local area networks (LANs) 210 and 220, although the invention may work advantageously with other communication media configurations such as point-to-point network links. Communication among the stations of the network is typically effected by exchanging discrete data packets or frames between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 3:
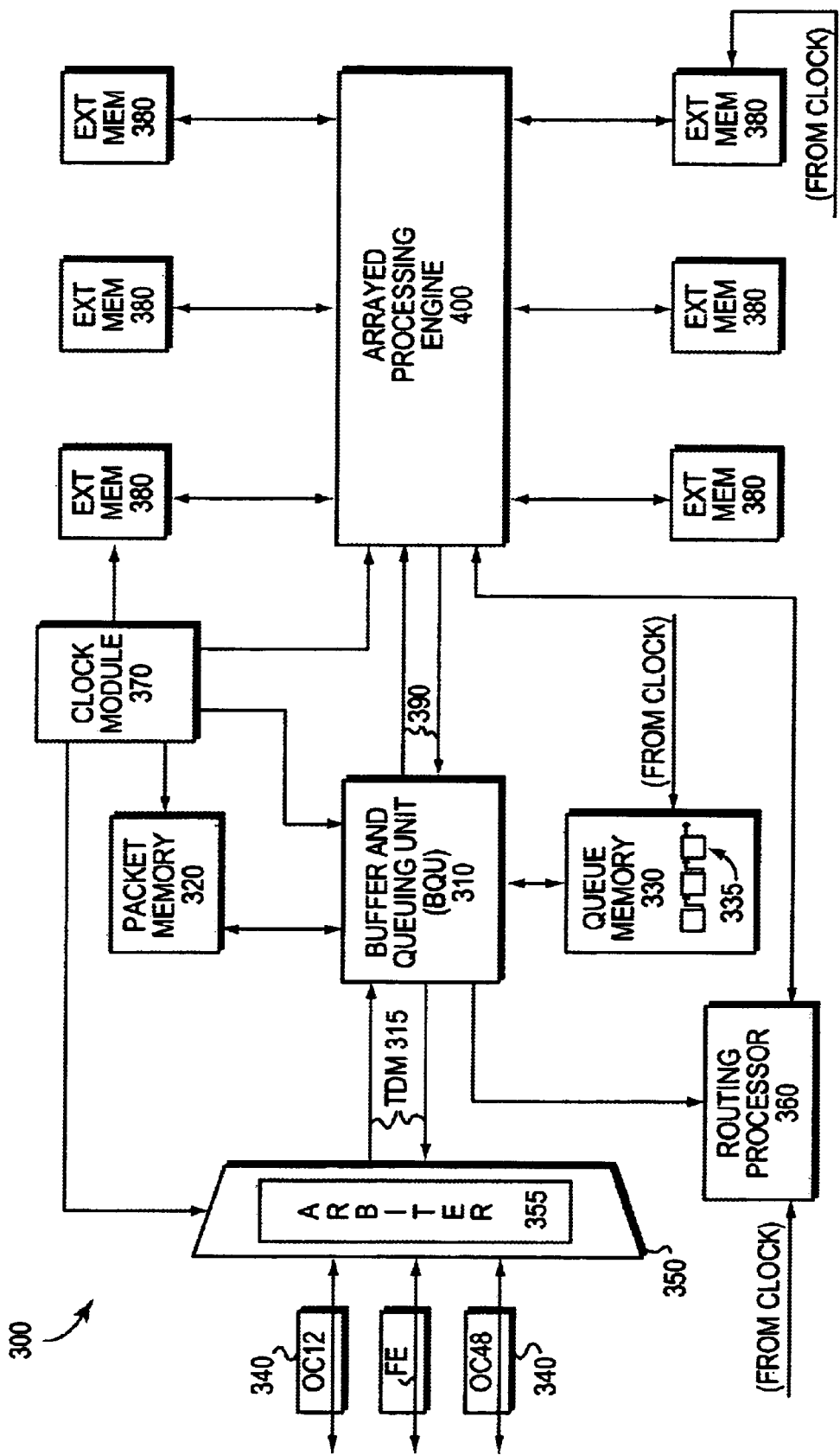
FIG. 3 is a schematic block diagram of an intermediate station, such as a network switch, that may be advantageously used with the present invention.

FIG. 3 is a schematic block diagram of intermediate station 300 which, in the illustrative embodiment, is preferably a network switch. The switch generally performs layer 2 processing functions, such as "cut-through" operations wherein an entire frame does not have to be stored before transfer to a destination; in addition, switch 300 may implement layer 3 forwarding operations. It should be noted, however, that the intermediate station may also be configured as a router to perform layer 3 route processing. A feature of the processor architecture described herein is the ability to program the station for execution of either layer 2 and layer 3 operations. To that end, operation of the switch will be described with respect to data encryption of packets, although the switch may be programmed for other applications, such as IP switching of frames/packets.

The switch 300 comprises a plurality of interconnected components including an arrayed processing engine 400, various memories, queueing logic 310 and network port interface cards 340. Operations of these components are preferably synchronously controlled by a clock module 370 although the arrayed elements of the processing engine may be operatively configured to function asynchronously. In the illustrative embodiment, the clock module 370 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the encryption operation of the switch.

The arrayed processing engine 400 is coupled to a memory partitioned into a plurality of external memory (Ext Mem) resources 380. A buffer and queuing unit (BQU) 310 is connected to a packet memory 320 for storing packets and a queue memory 330 for storing network layer headers of the packets on data structures, such as linked lists, organized as queues 335. The BQU 310 further comprises data interface circuitry for interconnecting the processing engine with a plurality of line cards 340 via a selector circuit 350 having an arbiter 355. The line cards 340 may comprise, e.g., OC12, OC48 and Fast Ethernet (FE) ports, each of which includes conventional interface circuitry that incorporates the signal, electrical and mechanical characteristics, and interchange circuits, needed to interface with the physical media and protocols running over that media A typical configuration of the switch may include many input/output channels on these interfaces, each of which is associated with at least one queue 335 in the queue memory 330. The processing engine 400 generally functions as a switching processor that modifies packets and/or headers in sequence as the BQU 310 implements queuing operations.

A routing processor (RP) 360 executes conventional routing protocols for communication directly with the processing engine 400. The routing protocols generally comprise topological information exchanges between intermediate stations to determine optimal paths through the network based on, e.g., destination IP addresses. These protocols provide information used by the RP 360 to create and maintain routing tables. The tables are loaded into the external partitioned memories 380 as forwarding information base (FIB) tables used by the processing engine to perform forwarding operations. When processing a header in accordance with IP switching, the engine 400 determines where to send the packet by indexing into the FIB using an IP address of the header. Execution of the forwarding operations results in destination media access control (MAC) addresses of the headers being rewritten by the processing engine to identify output ports for the packets.

Figure 4:
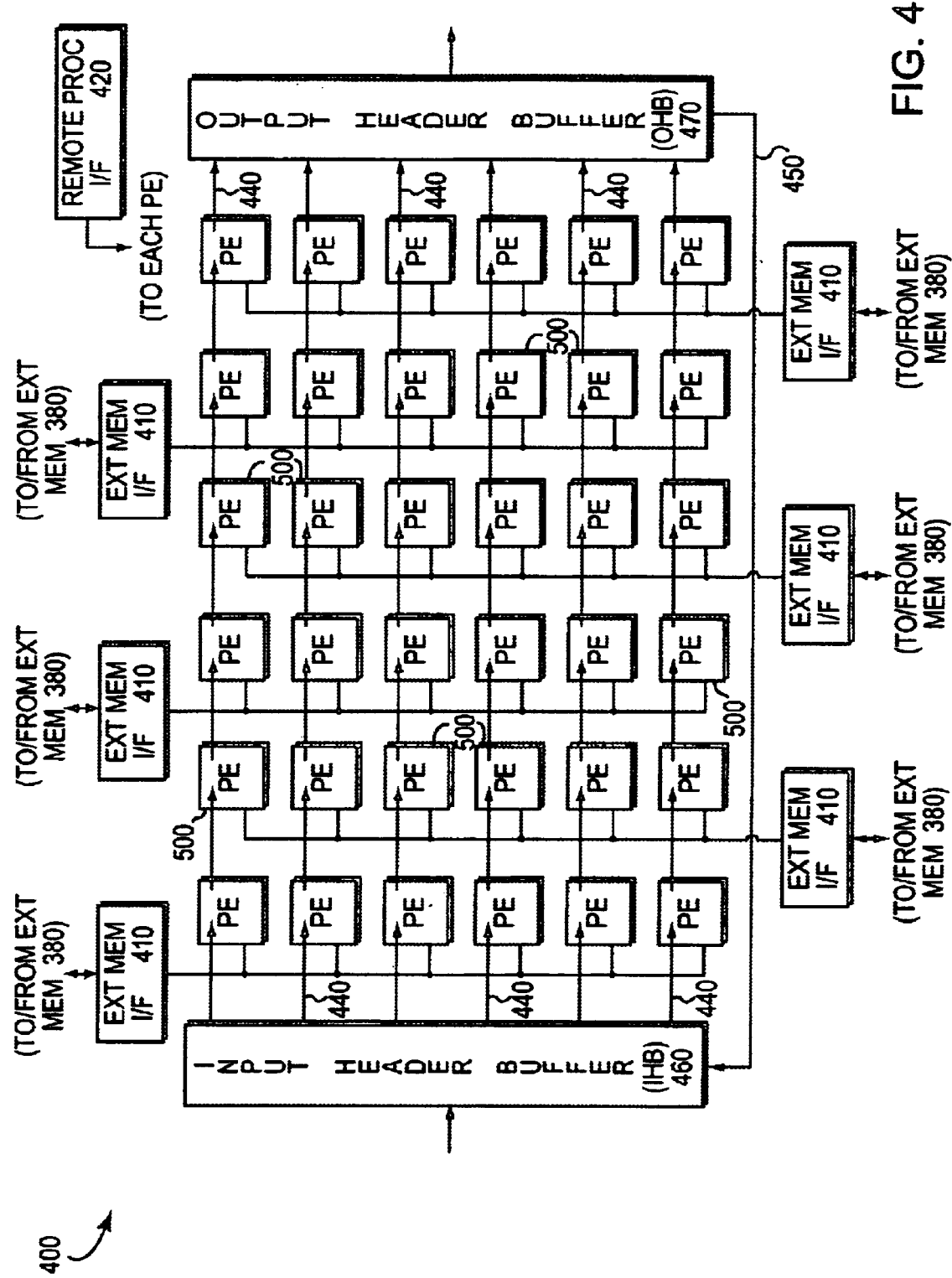
FIG. 4 is a schematic block diagram of a programmable arrayed processing engine having a plurality of processor complex (PE) elements.

FIG. 4 is schematic block diagram of a programmable processing engine 400 that may be advantageously used with the present invention. The processing engine comprises a plurality of processing elements (PE) 500 symmetrically arrayed into multiple rows and columns; in the illustrative embodiment, the PEs are arrayed as six (6) rows and six (6) columns in a 6×6 arrayed configuration that is embedded between an input header buffer (IHB) 460 and an output header buffer (OHB) 470. Note that other configurations, such as a 4×4 arrayed configuration, may be used in advantageously used with the present invention.

A 64-bit feedback path 450 couples the OHB 470 to the IHB 460 and provides a data path for recycling data through the PE stages of the processing engine. The PEs of each row are configured as stages connected in series by a 100 MHz 64-bit direct memory access (DMA) data path 440 that synchronously transfers data and control "context" from one PE to the next. Specifically, the processing elements of each row are configured as stages of a pipeline that sequentially execute operations on the transient data loaded by the IHB 460, whereas the processing elements of each column operate in parallel to per form substantially the same operation on the transient data, but with a shifted phase. An example of an arrayed processing engine and network switch suitable for use with the present invention is described in commonly-owned U.S. Pat. No. 6,513,108, issued Jan. 28, 2003, titled *Programmable Arrayed Processing Engine Architecture for a Network Switch*, which is hereby incorporated by reference as though fully set forth herein.

Figure 5:
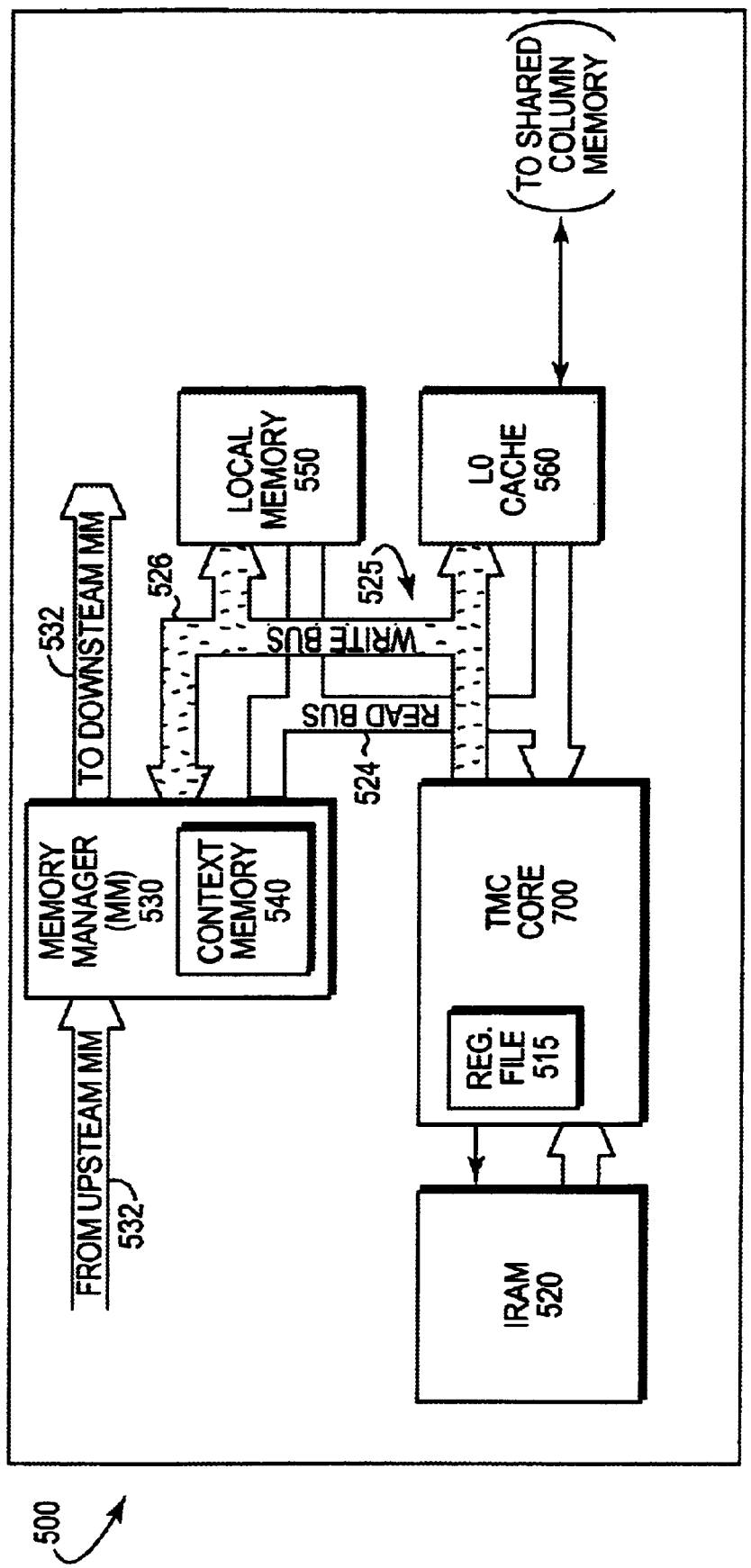
FIG. 5 is a schematic block diagram of a PE element comprising a microcontroller processor (TMC) core for use with the present invention.

FIG. 5 is a schematic block diagram of a PE 500. The PE is a processor complex comprising a processor 700 coupled to an instruction memory (IRAM) 520 and a memory manager (MM) circuit 530. The IRAM 520 stores instructions for execution by the processor 700, which is preferably a customized microcontroller (TMC) core having a dense structure which enables implementation of similar cores on an application specific integrated circuit. It will be apparent to those skilled in the art, however, that other processor cores may be advantageously used with the processor complex architecture described herein. The TMC core 700 is preferably a pipelined processor that includes a plurality of arithmetic logic units (ALUs), a register file 515 having a plurality of 32-bit internal registers and an instruction fetch and decode unit organized as a set of data paths. The internal registers generally store intermediate result information processed by the ALUs, whereas the instruction fetch and decode unit decodes instructions fetched from the IRAM. The intermediate results are passed among PE stages 500 of the engine 400 over a consistent data path channel 532 provided by the MM 530. The TMC also supports fast task context switching to enable software pipelining across multiple cores.

A 64-bit local bus 525 (comprising a read bus portion 524 and a write bus portion 526) interconnects the TMC core with a context memory 540, a local memory 550 and a level zero (L0) cache 560. The local bus 525 can sustain one 64-bit read operation and one 64-bit write operation per cycle for data aligned on a 4-byte boundary. The maximum sustainable rate for non-aligned data accesses is one 32-bit read operation and one 32-bit write operation per clock cycle. The TMC core may directly access locations in the context memory 540 and the local memory 550 using an operand address associated with an instruction. Notably, the context memory 540 and the local memory 550 support zero wait state non-aligned accesses; accordingly, there is generally no performance difference when accessing data in those memories or the internal registers of the TMC core.

Context memory 540 stores transient "context" data (e.g., packet/frame data) flowing through the PE 500 that is unique to a specific process, whereas the local memory 550 is generally configured to store, inter alia, pointers that reference data structures and tables stored in external memory 380 for use by the TMC core 700. As described further herein, however, the local memory 550 stores keys associated with data encryption/decryption operations directed to IP packet header and payload processing. Management of the context sensitive memory is provided by the MM 530, which comprises data path and control logic for cooperating with the context memory 540 to efficiently pass data among the PE stages of the processing engine. The L0 cache 560 may be a fully associative, multiport data cache that services external memory 380 and a shared column memory (not shown); notably, the L0 cache provides various caching and buffering functions for those memories, and may further issue specific memory primitives to the appropriate memory controller of either the external or internal shared memory to thereby increase the overall bandwidth and efficiency of the TMC 700.

The TMC architecture incorporates a superscalar design capable of executing more than one instruction per cycle through the use of multiple execution units performing multiple scalar operations in parallel. The execution units are a main execution unit (M-unit) and a secondary execution unit (S-unit). The M-unit includes specialized tightly coupled state machine (TCSM) units, each of which may be selectively invoked ("plugged in") within the data paths of the processor. Differences between the two execution units are that the S-unit does not accomodate these TCSM units and does not directly address memory. Parallel operation of execution units increases the processing performance of the switch while also decreasing the number of data transfers over the local bus. For such a superscalar design, an instruction decoder determines whether an execution unit is ready for operation. The TMC architecture utilizes a wide instruction that explicitly schedules operation of the execution units.

In the illustrative embodiment, the TMC core 700 uses a 64-bit instruction word to operate on multiple 32-bit data values. Logical operations are performed on indirect memory operands to improve the overall density of the instruction code by merging arithmetic instructions with load/store instructions into one instruction. Broadly stated, multiple opcodes of differing widths can be encoded in a fixed length instruction word. Each instruction word contains two major opcodes and up to three minor opcodes (micro-ops) that execute in parallel. Instruction level parallelism is scheduled by software as opposed to hardware, thereby eliminating the need for hardware-based schedulers while enabling completion of multiple instructions per cycle. An instruction set architecture provides micro-opcodes to initiate memory prefetches without requiring a dedicated instruction.

Figure 6:
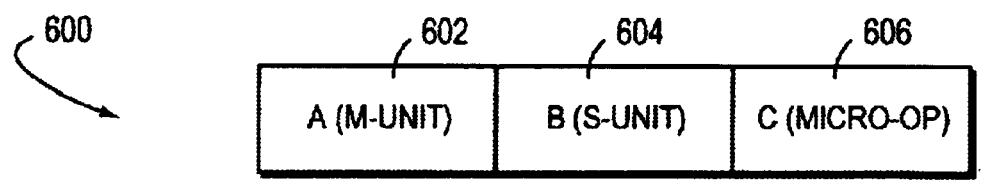
FIG. 6 is a schematic diagram of a TMC instruction that may be advantageously used with the present invention.

Each instruction generally includes two primary opcodes, one of which is directed to the M-unit (e.g., MOR) and the other which is directed to the S-unit (e.g., SOR). As noted, each opcode executes concurrently on its respective unit and in parallel with the other. FIG. 6 is a schematic diagram of a TMC instruction 600 comprising a 32-bit A part 602 containing an opcode directed to the M-unit, a 22-bit B part 604 containing an opcode issued to the S-unit (or branch unit), and a 10-bit C part 606 comprising three micro-opcode fields, the latter of which is used for execution of the DES function as described further herein.

Figure 7:
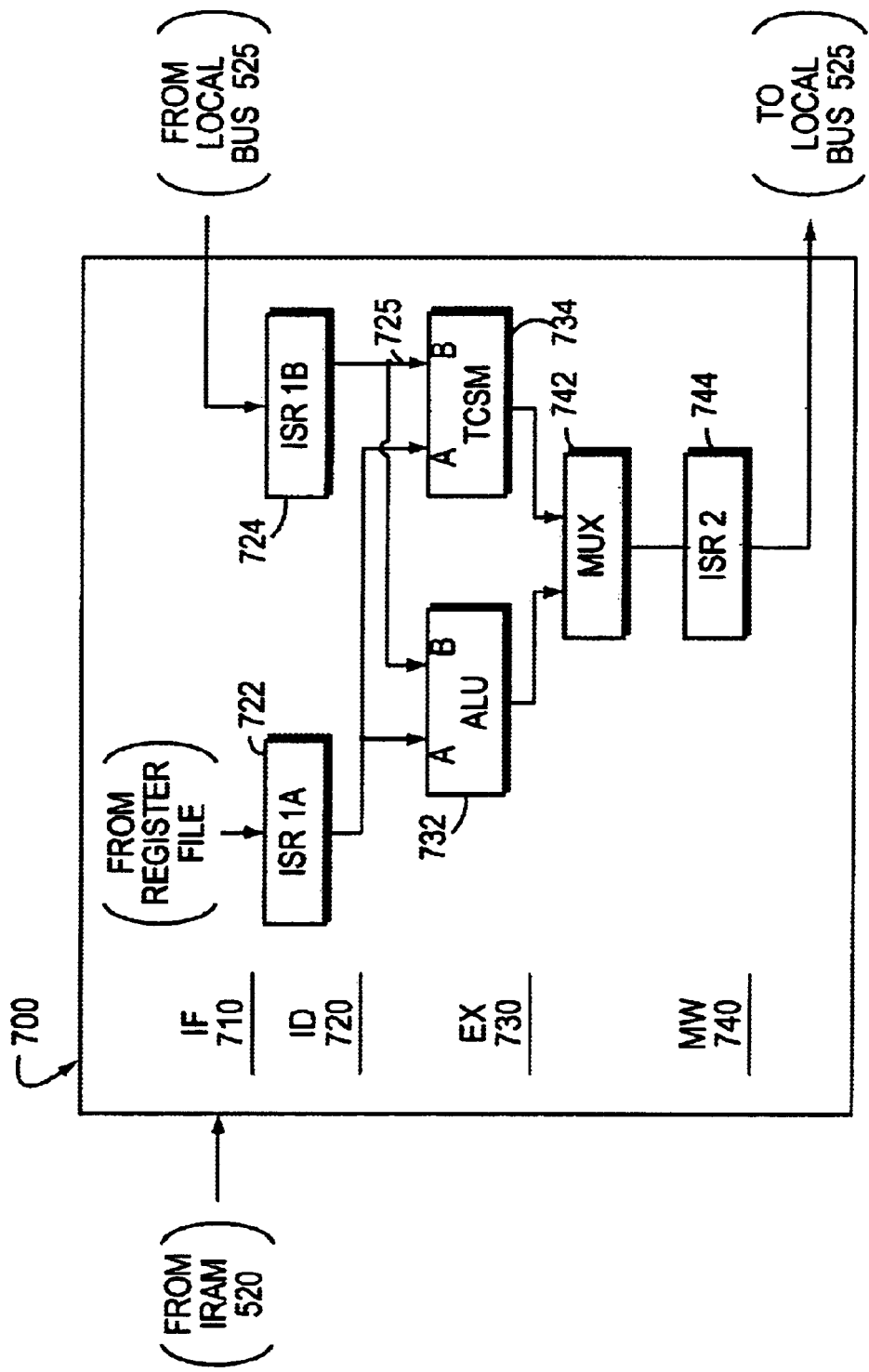
FIG. 7 is a schematic diagram of the TMC core which preferably embodies a multi-stage pipeline design comprising an execution stage of tightly coupled state mas chine (TCSM) units.

FIG. 7 is a schematic diagram of the TMC core 700 which preferably embodies a multi-stage pipeline data path organization comprising (i) an instruction fetch (IF) stage 710; (ii) an instruction decode (ID) stage 720; (iii) an execution (EX) stage 730; and (iv) a memory write-back (MW) stage 740. A plurality of interstage registers ISR1A 722 and ISR1B 724 are used with the ID stage, while an ALU 732 and a TCSM 734 are used in the EX stage. According to the TMC micro-architecture, memory operands are stored in ISR1B and provided to the B sides of the ALU and TCSM, whereas intermediate operands are stored in ISR1A and provided to the A sides of those logic units. Another interstage register ISR2 744 is provided at the MW stage for data that is destined for the local bus 525; for instructions that specify the internal register file as the destination of the data, the write-back actually occurs during the EX stage.

Functionally, the IF stage accomodates accesses to the IRAM to acquire instructions. The ID stage fetches information (such as source operands) from memory over the local bus 525 or from the internal register file 515 for temporary storage in ISR1B; the fetched information flows through the EX stage of TMC execution units to ISR2, where the MW stage transfers the information from ISR2 to either the L0 cache/tag buffer 560, the context memory 540 or to the local memory 550. Within this context, the invention is directed, in part, to the EX stage and the use of a specialized TCSM execution unit.

The invention extends the function of a typical TMC execution unit (such as an ALU) to provide protocol specific functions to effectively "speed-up" state machine operations that typically take a long time to execute using the ALU. The TMC architecture is generally configured for IP routing and, as described herein, encryption processing; therefore protocol processing in the context of the present invention comprises processing of protocols contained in, e.g., an IP header, to determine the appropriate encryption algorithm.

Although protocol processing is separate from data encryption, both functions utilize the similar execution unit circuitry and, thus, the invention further relates to merging of these functions within the TMC core.

Specifically, the invention relates to an encryption mechanism that tightly-couples hardware data encryption functions with software-based protocol decode processing within the TMC processor core 700. Tight-coupling is achieved by the TMC micro-architecture which allows encryption functions to be accessed as a novel encryption TCSM unit of the TMC. Such coupling substantially reduces the latency associated with conventional hardware/software interfaces. Additional mechanisms, such as branch instructions, enable the software executing on the processor to receive encryption status information (i.e., completion status) in an efficient manner.

Increased processing performance is realized by, inter alia, a reduction in latency and bandwidth consumption when migrating between protocol decode (which is a precursor to encryption) and encryption operations. For example, once the TMC processor finishes protocol decoding, or at least proceeds far enough to realize encryption/decryption is required, it can immediately start a DMA operation to fetch the initial keys needed for encryption/decryption. Upon fetching the keys, the required data is localized within the processor, which obviates the need for data transfers over the local bus and across external interface boundaries.

In the illustrative embodiment, the novel TCSM unit executes a conventional DES encryption/decryption algorithm as defined by National Bureau of Standards Data Encryption Standard, Federal Information Processing Standards Publication 46-1, Jan. 22, 1988; however, it should be noted that other data encryption algorithms, such as public key encryption algorithms, may be used in accordance with the principles discussed herein. Broadly stated, encryption of data according to the DES algorithm entails the following steps:

1. Sub-key generation. DES is an iterative algorithm that executes a plurality of "rounds" (e.g., 16) for a single DES operation, wherein each round requires a new sub-key. Each sub-key is 48 bits in length and is derived from an initial key that is generally stored as a 64-bit field despite typically having a length of 56 bits. From a software protocol perspective, the sub-key generation stage may be embodied as a state machine and, as described herein, sub-key generation is performed on demand by a state machine of the encryption TCSM unit in response to a single read operation over the local bus that fetches the initial key from local memory. A conventional software solution requires 15 additional bus (fetch) operations to local memory; in accordance with the invention, however, these additional bus operations are eliminated by the use of the novel pipelined processor mechanism. The elimination of bus operations translates into a marked "speed-up" improvement over the software solution, thus providing a significant motivation for the invention.

2. Initial Permutation. This step permutes the order of "cleartext" packet data bits to an initialized arrangement for the first DES round by essentially "criss-crossing" the bit ordering of the cleartext data stream. This step occurs once for each DES round (i.e., once for each 64-bit block of encryption).

3–5. Expansion Permutation. S-box Permutation and P-box Permutation. These steps are iterated 16 times according to the conventional standard.

6. Final Permutation. This step results in the production of encrypted "ciphertext". Note that Steps 1–6, including the iterated Steps 3–5, comprise a single DES encryption procedure; in the case of triple DES encryption, this procedure is repeated two additional times.

Figure 8:
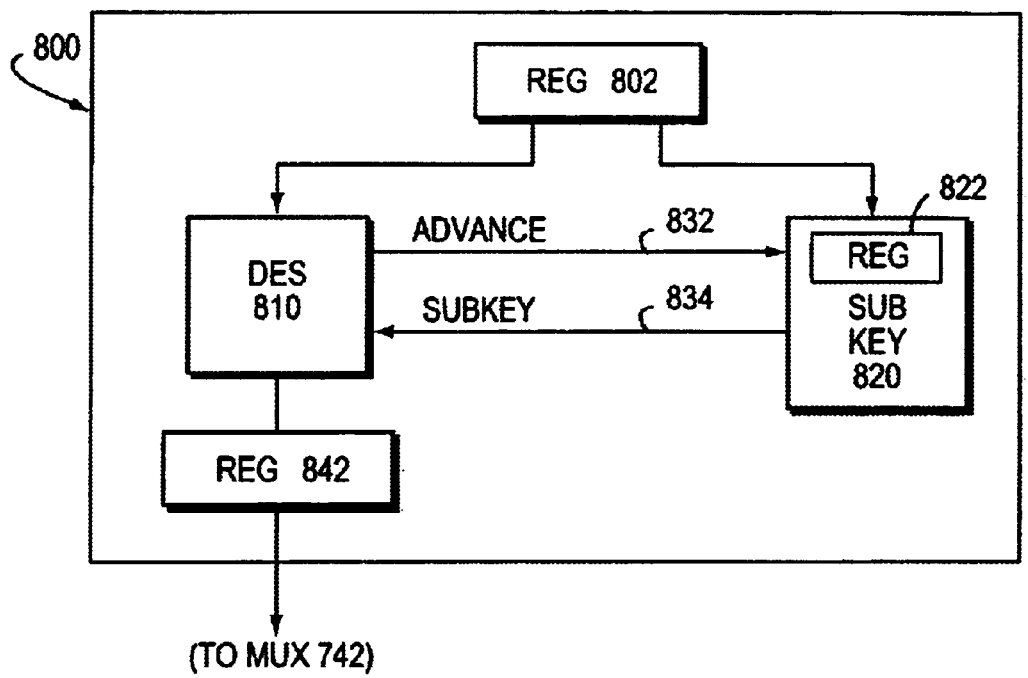
FIG. 8 is a schematic diagram of a novel encryption TCSM unit comprising a DES functional component and a sub-key functional component in accordance with the present invention.

According to the invention, the encryption TCSM unit is plugged into the EX stage 730 of the M-unit pipeline by "tapping off" a 64-bit data bus 725 at the output of ISR1B 724. FIG. 8 is a schematic diagram of the novel encryption TCSM unit 800 that comprises two primary functional components: (i) a DES function 810 that includes state machine hardware used to execute each round of the DES function and (ii) a sub-key state machine function 820 that generates the sub-keys as needed for each round of the DES function without delaying the DES round calculation. These functional components cooperate with the TMC resources to provide an encryption mechanism that enables software executing on the processor 700 to efficiently initiate the DES function performed by the TCSM unit.

The encryption mechanism comprises, in part, an integrated software and hardware interface that enables the encryption TCSM unit 800 to cooperate with other data path resources of the TMC processor 700. In response to decode processing of the native opcodes, the encryption TCSM unit is invoked to perform encryption/decryption functions that utilize the hardware interface of the TMC to access that processor's resources, including a plurality of high-performance internal busses that faciliate overlapping of operations. For instance, the encryption TCSM unit can simultaneously load an encryption key while storing a previous encryption result. Overlapping of operations improves encryption throughput by further reducing latency typically associated with a conventional encryption hardware module attached to a processor's external bus.

An instruction decoder (not shown) of the TMC issues instructions, including native encryption opcodes, directly to the encryption TCSM unit to thereby substantially reduce encryption setup latency. These native encryption opcodes are provided within the TMC's instruction set and constitute the software portion of the interface that enables is selective access to the encryption unit. Although it is possible to extend existing instruction sets to include similar encryption opcodes, the resulting instruction set may not achieve "seamless integration" and, as a consequence, additional latency may be introduced.

FIG. 9 is an example of an illustrative program code segment 900 of instructions, including novel native encryption opcodes, in accordance with the invention. The encryption TCSM 800 is initialized by a first instruction 910 XDES ENCRYPT to define the form of operation (encryption or decryption) to be performed. In particular, the ID stage 720 decodes XDES ENCRYPT to a first portion (XDES) that initializes the DES function 810 of the TCSM 800 and a second portion (ENCRYPT) that initializes the sub-key generation function 820 of that unit. Decode of the ENCRYPT instruction portion initializes the sub-key generation component so that when a new initial key is loaded, it is assumed that it is for purposes of encryption.

A second instruction 920 is retrieved by the IF stage 710 to load an initial key. This instruction comprises, inter alia, a 32-bit primary opcode field 922 and a 10-bit micro-opcode field 924, the latter of which contains three (3) micro-opcodes. The primary opcode field 922 contains a primary opcode MOR along with various operands, while the portion of the micro-opcode field 924 directed to encryption contains a 3-bit micro-opcode INIT KEY. The micro-opcode INIT KEY and the primary opcode MOR compliment one another such that the micro-opcode shares the operand decode from the primary opcode portion of the instruction.

The primary opcode MOR is decoded such that M denotes the ALU associated with the M-unit and OR denotes the logical operation performed by that ALU. This primary opcode also defines the formats of its operands, which include a source operand (r0) that specifies an input (A) to the ALU, a destination operand (r0) that specifies an output for storing the result of the logical operation, and a displacement operand that specifies a displacement into the local memory for retrieving the initial key. The displacement operand essentially specifies a constant (KEY) and a displacement register (r0) such that the displacement into the memory is manifested as a constant plus a base register. Note that the context memory 540 and local memory 550 are organized such that the base register r0 can be used to access those memories, thereby saving an internal register.

Execution of the second instruction 920 results in local memory 550 being accessed at the displacement operand value to retrieve a key stored in the memory. The key is then transferred over the local bus 525 and loaded into ISR1B 724, while the contents of r0 are loaded into ISR1A 722. The primary opcode causes a logical OR operation between the contents of the two loaded registers at the ALU 732; the result is stored at the destination operand r0 and is effectively discarded. Meanwhile, execution of the micro-op INIT KEY, which is directed to Step 1 (sub-key generation) of the DES function, moves the key from memory 550 into the sub-key function 820 of the encryption TCSM unit 800.

Specifically, decode of the operands in the ID stage 720 loads ISR1B with the key and, although the results of primary opcode execution are discarded, execution of the micro-op during the EX stage 730 specifies further loading of that key operand data (ISR1B) into the encryption TCSM. In particular, the INIT KEY micro-op specifies that the data be loaded from a register 802 of the encryption TCSM 800 to the sub-key generation hardware component 820. Accordingly, the initial key is loaded into an internal register 822 retrieved from memory. This completes set-up of the initial key portion of the DES function.

A third instruction 930 is then retrieved by the IF stage to load the "plaintext" data and start the DES function. In the illustrative embodiment, the plaintext is packet data stored in context memory 540. Note that this third instruction is similar to the second instruction with the exception of the micro-op field contents. That is, the primary opcode is a MOR opcode, the source and destination operands are r0, and the displacement operand comprises a constant (PLAIN) along with the base register r0. Here, the PLAIN(R0) displacement operand defines an offset into the context memory for locating plaintext packet data, whereas KEY(r0) defines an offset into the local memory for locating the initial key.

Notably, the micro-opcode for this third instruction is DES. In accordance with instruction execution, plaintext packet data is fetched from context memory 540 in response to the MOR opcode and loaded into ISR1B 724 during the ID stage 720 and, similar to the previous instruction, the result of the primary opcode execution during the EX stage 730 is not used. Therefore, the primary focus is again on the micro-op field and, in particular, operation of the DES micro-op during the EX stage. The micro-op DES specifies loading of the ISR1B contents into the DES hardware component 810 of the encryption TCSM unit 800.

The DES and sub-key functions of the encryption TCSM unit are preferably embodied as state machines that cooperate in parallel to generate a sub-key per DES round "on the fly". The DES micro-operation initiates the DES state machine to perform operations on the plaintext according to the DES standard, including the initial permutation (Step 2) followed by 16 cycles of DES function processing (Steps 3–5 iteratively) to the eventual final permutation (Step 6) that produces ciphertext. As each DES round advances, the DES state machine hardware sends an advance signal over line 832 to the sub-key state machine hardware 820, which responds by providing a sub-key over line 834 to the DES state machine 810.

After 16 cycles, the ciphertext results of a single DES function are then stored in an internal register 842 coupled to an output of the DES hardware unit 810 in accordance with an internal access register (IAR) operation 940. Note that prior to the 16 cycles, the register 842 stores intermediate results. The IAR operation is used because all internal TCSM registers are mapped to the internal register address space of the TMC processor. The IAR instruction 940 is of the format SPR, IAR, DES_RESULT, wherein SPR denotes a set pointer register, IAR denotes an internal address register or pointer register that is directly accessed and DES_RESULT is a constant.

Thereafter, another instruction 950 having a MOR primary opcode is executed to write the contents of the selected internal register to a destination specified by operand CIPHER(r0), which specifies an index into context memory. The placement of the ciphertext results in context memory would generally overwrite the location of the original plaintext packet data since there is no longer any use for that original data. The instruction 950 includes a micro-opcode TR which is a transform register micro-operation used to access the internal registers.

Specifically, a result multiplexer 742 having inputs from the ALU 732 and encryption TCSM is enabled by the instruction 950 to select the results from one of the registers in these units and load those results into the ISR2 register 744. The TR micro-op, in conjunction with specific bits of the IAR register, are used to essentially control this multiplexer. In the illustrative embodiment, there are a maximum of eight TCSM units, each having an internal register; accordingly, only three bits of the LAR register are needed to access each of these registers.

Figure 10:
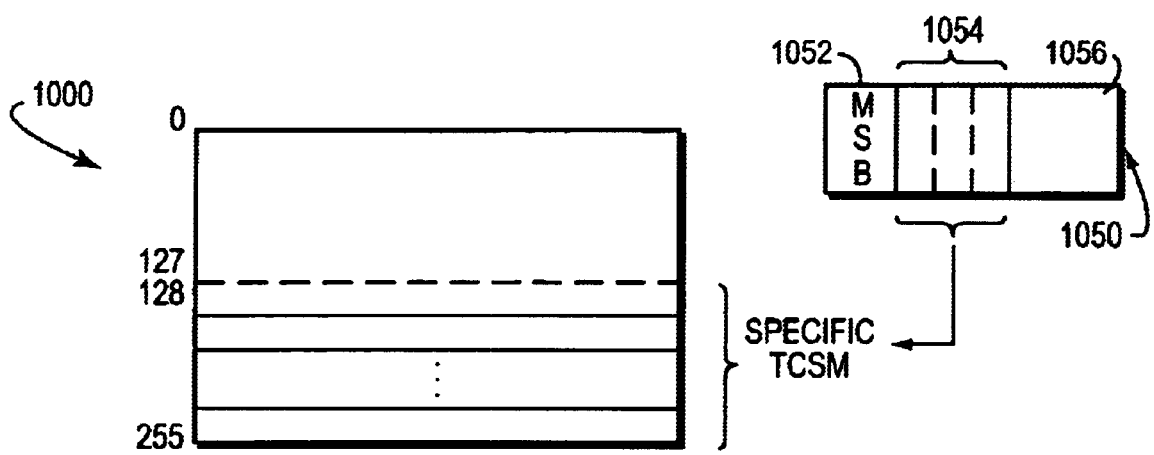
FIG. 10 is a schematic diagram of TMC internal register space that may be accessed through the use of an internal access register.

FIG. 10 is a schematic diagram of the TMC internal register space 1000 which may be accessed through the use of an IAR register 1050. There are illustratively 256 entries in the register space, each having a 32-bit value. Therefore, the IAR register 1050 functions as an 8-bit pointer to this internal register space. The upper half of the register space is used for TCSM units and the 8-bit IAR pointer is directed to an entry in this space. Specifically, the MSB 1052 of the IAR is set to point to the TCSM half of the internal register space, whereas the lower bits 1056 of the IAR 1050 specify a particular register of a TCSM; accordingly each TCSM may have up to 16 internal registers. The remaining 3-bit field 1054 specifies a particular TCSM; these bits are provided to the multiplexer 742 for selecting an internal register containing the result of a TCSM unit 734.

Therefore, the TR micro instruction and the IAR bits select the internal register of the encryption TCSM (instead of the ALU internal register) whose ciphertext contents are loaded into the ISR2 register 744. During the MW stage 740, the ciphertext is transferred to context memory at a location specified by the displacement operand CIPHER. This completes a single DES operation for 64 bits of plaintext data; the more common triple DES function requires iterating through the DES function steps two additional times using (one or) two different keys, i.e., KEY1, KEY2 and, if necessary, KEY3 for each iteration.

The previous description of the TMC processor execution has been directed to a single processor complex element (PE) of the processing engine. In the illustrative embodiment, the PEs are arrayed into multiple columns and rows, and execution of the DES function may be pipelined across the PE columns. For example, a first column may perform the sub-key generation function, while a second column performs a first DES function round with the third and fourth columns performing second and third DES function rounds required for triple DES encryption. As the first DES round transforms the plaintext into ciphertext, the data mover circuits forward the ciphertext results from the context memories of the second column PEs to the context memories of the third column PEs. The third column PEs then execute their DES function rounds on the ciphertext data as though it were plaintext data, with the result being "double" DES encryption. The data mover circuits then forward these ciphertext data results to the context memories of the fourth column PEs, where the data are transformed into triple DES encrypted ciphertext.

The instruction code described herein may be loaded into the IRAM 520 of each processor complex element. The limiting factor to this implementation is the ability to retrieve keys from the memory and load them into the encryption TCSM unit. It should be noted that once retrieved from memory, the packet data does not traverse the local bus again until it is converted to ciphertext; this is because the data moves from column to column within the processing engine via the data mover circuits, thereby substantially improving memory bandwidth.

In summary, the inventive mechanism provides speed-up enhancements for the entire data encryption/decryption function. The encryption mechanism eliminates at least two complete local bus transfers of a conventional encryption approach wherein each transfer comprises four 64-bit transfers along with latencies associated with traversing the external interface circuitry. Use of the specialized encryption TCSM unit obviates the physical limitation associated with pin counts of a hardware module coupled to the bus. The inventive mechanism substantially increases throughput of the memory subsystem by eliminating the shared memory bandwidth capability of the external interface between the local bus and a conventional DES module. Moreover, CPU notification of data encryption/decryption completion (interrupt-driven or polling) is eliminated by the invention, thereby reducing latencies and bandwidth associated with such notification.

While there has been shown and described an illustrative embodiment for tightly-coupling hardware data encryption functions with software-based protocol decode processing within a pipelined processor of a programmable processing engine, it is to be understood that various other adaptations and modifications may be made within the spirit and scope of the invention. For example, in an alternate embodiment of the invention, a further optimization for pipelining the DES function is provided. Referring again to the instruction code segment of FIG. 9, another instruction 960 may be substituted for the instruction 950 to enable simultaneous reading and loading of data in the encryption TCSM unit 800. In the presence of the DES micro-op, the contents of the result bus are results of the last DES operation. The instruction 950 is directed to performance of a single DES function and then storage of the result. If it is desired to encrypt a stream of data, the instruction 960 may be substituted for the instruction 950.

The instruction 960 has a primary opcode MOR, an indirect displacement destination operand (r1) which has to be loaded, a displacement operand of PLAIN1 (r0) and a micro-op DES. PLAIN1(r0) is a displacement source operand used to reference a next session (i.e., the next 64-bit block) of plaintext for encryption. This allows simultaneous loading and reading of plaintext data. Essentially, the source operand data is loaded into the ISR1B register as two operations that occur during the EX stage: reinitialization of the encryption TCSM for a current operation on the plaintext data while reading the result of the previous DES operation and moving that result to memory. Notably, this optimization can save execution of otherwise two instructions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for tightly-coupling hardware data encryption functions with software-based protocol decode processing within a pipelined processor of a programmable processing engine in a network switch, the apparatus comprising: an encryption execution unit contained within the pipelined processor; an ALU contained within the pipelined processor; an instruction decode stage (ID stage), in response to reading an opcode, enables the encryption execution unit to read data from a memory shared by the ALU and the encryption execution unit, and for the encryption execution unit to process the data read from the shared memory; and a multiplexer to select as an output a result of processing by the encryption execution unit rather than a result of ALU processing.

2. The apparatus of claim 1 wherein the encryption execution unit is an encryption tightly coupled state machine (TCSM) unit that is selectively invoked within the pipelined processor.

3. The apparatus of claim 2, further comprising: native encryption opcodes provided within an instruction set of the pipelined processor to enable selective access to the encryption TCSM unit by software.

4. The apparatus of claim 3, further comprising: a plurality of busses internal to the pipelined processor and wherein a hardware portion of the interface allows the encryption TCSM unit to utilize the internal buses in response to decode processing of the native encryption opcodes.

5. The apparatus of claim 4, further comprising: the pipelined processor is a microcontroller core (TMC) processor having a multi-stage pipeline architecture that includes an instruction fetch stage, an instruction decode stage, an execution stage and a memory write-back stage.

6. The apparatus of claim 5, further comprising: the TMC processor further includes an arithmetic logic unit, at least one internal register, an instruction fetch and decode unit and the encryption TCSM unit organized as a data path.

7. The apparatus of claim 5 wherein the encryption TCSM unit comprises: a data encryption standard (DES) functional component cooperatively coupled to a sub-key generation functional component.

8. The apparatus of claim 7 wherein the DES functional component comprises: state machine hardware used to execute each round of a DES function.

9. The apparatus of claim 7, further comprising: the sub-key generation functional component comprises state machine hardware that generates a sub-key as needed for each round of a DES function.

10. A method for tightly-coupling hardware data encryption functions with software-based protocol decode processing within a pipelined processor of a programmable processing engine in a network switch, the method comprising the steps of: providing an encryption execution unit within the pipelined processor; providing an ALU within the pipelined processor; enabling, by an instruction decode stage (ID stage) in response to reading an opcode, the encryption execution unit to read data from a memory shared by the ALU and the pipelined processor, and for the encryption execution unit to process the data read from the memory; and selecting as output the result of processing by the encryption execution unit rather than selecting results from the ALU.

11. The method of claim 10, further comprising: having native encryption opcodes contained within an instruction set of the pipelined processor; and issuing the native encryption opcodes directly to the encryption execution unit to substantially reduce encryption setup latency.

12. The method of claim 11, further comprising: decoding the native encryption opcodes at the instruction decode stage; and in response to the step of decoding, invoking the encryption execution unit to perform encryption/decryption functions at the execution stage.

13. The method of claim 12, further comprising: protocol processing of protocols contained in a plaintext stored at the network switch to determine an appropriate encryption algorithm; upon determining the appropriate encryption algorithm, immediately starting an operation to fetch initial keys needed to perform the encryption/decryption functions; and upon fetching the keys, providing the keys to the encryption execution unit within the TMC processor.

14. The method of claim 13, further comprising: including a plurality of high-performance busses internal to the TMC processor; and accessing the internal busses to simultaneously load an encryption key and store a previous encryption result.

15. The method of claim 12 further comprising the step of, wherein the encryption execution unit is an encryption tightly coupled state machine (TCSM) unit: initializing the encryption TCSM unit in response to execution of a first instruction that defines the form of operation to be performed.

16. The method of claim 15 wherein the encryption TCSM unit comprises a data encryption standard (DES) functional component cooperatively coupled to a sub-key generation functional component and wherein the step of initializing comprises the steps of: decoding a first portion of the first instruction to initialize the DES functional component; and decoding a second portion of the first instruction to initialize the sub-key generation functional component.

17. The method of claim 16 further comprising the step of: executing the second instruction having a micro-opcode field containing a native encryption opcode that specifies loading an initial key from a memory into the sub-key generation functional component of the encryption TCSM unit.

18. The method of claim 17 further comprising the step of: performing a DES function on a plaintext in response to execution of a third instruction having a micro-opcode field containing a native encryption code that specifies loading of the plaintext into the DES functional component of the encryption TCSM unit and initiating DES operations; and upon completing the DES operations, storing a ciphertext result in an internal register coupled to the DES functional component.

19. The method of claim 18 further comprising the step of: executing a fourth instruction to store the ciphertext results contained in the internal register to a location in the memory.

20. A pipelined processor in a network switch, the processor comprising: an ALU internal to the processor responsive to a first set of opcodes; an encryption execution unit internal to the processor having an encryption tightly coupled state machine (TCSM) responsive to a second set of opcodes; an instruction decode stage (ID stage) to decode an opcode, the ID stage, in response to an opcode of said second set of opcodes, transferring processing to the encryption execution unit; a multiplexer to select output from the ALU OR from the encryption execution unit.

21. The processor of claim 20, wherein the processor is a microcontroller core (TMC) processor and further comprises: an instruction fetch stage; an execution stage to execute an instruction decoded by the ID stage; and a memory write-back stage to write a result of said execution stage to memory.

22. The processor of claim 20, further comprises: one or more internal registers; a bus operatively connecting the one or more internal registers to both the ALU and the encryption execution unit; and a multiplexer having inputs from both the ALU and the encryption execution unit, the multiplexer outputting a selected input.

23. The processor of claim 20, wherein the encryption TCSM unit comprises: a data encryption standard (DES) functional component cooperatively coupled to a sub-key generation functional component.

24. The processor of claim 23, wherein the DES functional component comprises: a state machine that executes each round of a DES function.

25. The processor of claim 23, wherein the sub-key generation functional component comprises: a state machine that generates a sub-key as needed for each round of a DES function.

26. A method for providing encryption functions within a pipelined processor in a network switch, the method comprising the steps of:
associating a first set of opcodes with an ALU internal to the processor, the ALU performing protocol processing operations;
associating a second set of opcodes with an encryption execution unit internal to the processor, the encryption execution unit performing encryption operations;
decoding opcodes by an instruction decode stage (ID stage); transferring by the ID stage, in response to an opcode from said first set of opcodes, processing to the ALU; transferring by the ID stage, in response to an opcode from said second set of opcodes, processing to the encryption execution unit; and selecting output from the ALU OR from the encryption execution unit.

27. The method of claim 26, further comprises the step of: providing one or more internal registers; providing a bus operatively connecting the one or more internal registers to both the ALU and the encryption execution unit; providing a multiplexer having inputs from both the ALU and the encryption execution unit, the multiplexer outputting a selected input.

28. The method of claim 26 further comprising the step of: initializing the encryption TCSM unit in response to a first instruction that defines a form of operation to be performed.

29. The method of claim 28, wherein the step of initializing comprises the steps of: decoding a first portion of the first instruction to initialize a DES functional component; and decoding a second portion-of the first instruction to initialize a sub-key generation functional component.

30. The method of claim 26, further comprising the steps of: executing a second instruction including an encryption opcode that specifies loading an initial key from a memory into a sub-key generation functional component of the TCSM unit.

31. The method of claim 26, further comprising the steps of: performing a DES function in response to execution of a third instruction having a field containing an encryption opcode that specifies loading plaintext and initializing a DES operation.

32. A computer readable media, comprising:
said computer readable media containing instructions for execution in a processor for the practice of the method of,
providing a tightly-coupling hardware data encryption function with software based protocol decode processing within a pipelined processor of a programmable processing engine in a network switch; providing an encryption execution unit within the pipelined processor; providing an ALU within the pipelined processor; enabling, by an instruction decode stage (ID stage) in response to reading an opcode, the encryption execution unit to read data from a memory shared by the ALU and the pipelined processor, and for the encryption execution unit to process the data read from the memory; and
selecting as output the result of processing by the encryption execution unit rather than selecting results from the ALU.

33. A router, comprising: a processor having an instruction decode stage (ID stage) for processing opcodes; an ALU for performing protocol processing operations; a tightly coupled state machine (TCSM) for performing encryption processing; a shared memory for providing data to either the ALU or the TCSM; the ID stage, in response to reading an opcode, transferring processing to the TCSM, and the TCSM performing encryption processing on data read from the shared memory; a selector to select as output results from the ALU OR results from the TCSM.

34. The apparatus of claim 33, further comprising: the selector is a multiplexer.

35. The apparatus of claim 33, further comprising; the ALU selects whether the ALU or the TCSM reads data from the memory.

36. The apparatus of claim 33, further comprising: the TCSM performs DES data encryption standard encryption processing.

37. The apparatus of claim 33, further comprising: a sub-key generation component to provide a key to the TCSM.

38. A method for operating a router, comprising:
processing opcodes by an instruction decode stage (ID stage); performing encryption processing by a tightly coupled state machine (TCSM); performing protocol processing by an ALU; reading data from a shared memory by either the ALU or the TCSM;
transferring processing by the ID stage, in response to reading an opcode to the TCSM, and the TCSM performing encryption processing on data read from the shared memory;
selecting as output results from the ALU OR results from the TCSM.

39. The method of claim 38, further comprising: using a multiplexer for selecting as output results from the ALU OR results from the TCSM.

40. The method of claim 38, further comprising; selecting whether the ALU or the TCSM reads data from the memory.

41. The method of claim 38, further comprising:
performing DES data encryption standard encryption processing by the TCSM.

42. The method of claim 38, further comprising: providing a key to the TCSM by a sub-key generation component.

43. A router, comprising: means for providing a processor having an ALU for processing opcodes and a tightly coupled state machine (TCSM) for performing encryption processing; means for reading data from a shared memory by either the ALU or the TCSM; means for transferring processing by an instruction decode stage (ID stage), in response to reading an opcode, to the TCSM, and the TCSM performing encryption processing on data read from the shared memory; means for selecting as output results from the ALU OR results from the TCSM.

44. The apparatus of claim 43, further comprising: means for using a multiplexer for selecting as output results from the ALU OR results from the TCSM.

45. The apparatus of claim 43, further comprising; means for selecting by the ALU whether the ALU or the TCSM reads data from the memory.

46. The apparatus of claim 43, further comprising: means for performing DES data encryption standard encryption processing by the TCSM.

47. The apparatus of claim 43, further comprising: means for providing a key to the TCSM by a sub-key generation component.

48. A computer readable media, comprising:
said computer readable media containing instructions for execution in a processor for the practice of the method of,
providing encryption functions within a pipelined processor in a network switch, having the steps,
associating a first set of opcodes with an ALU internal to the processor, the ALU performing protocol processing operations;
associating a second set of opcodes with an encryption execution unit internal to the processor, the encryption execution unit performing encryption operations;
decoding opcodes by an instruction decode stage (ID stage);
transferring by the ID stage, in response to an opcode from the first set of opcodes, processing to the ALU;
transferring by the ID stage, in response to an opcode from said second set of opcodes, processing to the encryption execution unit; and selecting output from the ALU OR from the encryption execution unit.

49. A computer readable media, comprising: said Computer readable media containing instructions for execution in a processor for the practice of the method of operating a router, having the steps, processing opcodes by an instruction decode stage (ID stage); performing encryption processing by a tightly coupled state machine (TCSM); performing protocol processing by an ALU; reading data from a shared memory by either the ALU or the TCSM; transferring processing by the ID stage, in response to reading an opcode to the TCSM, and the TCSM performing encryption processing on data read from the shared memory; and electing as output results from the ALU OR results from the TCSM.

* * * * *